United States Patent Office 3,096,319
Patented July 2, 1963

3,096,319
COMPLEX METAL COMPOUNDS OF WATER-INSOLUBLE MONOAZO 3-INDAZOLE DYESTUFFS
Ulrich Dreyer and Werner Kirst, Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 11, 1961, Ser. No. 81,951
Claims priority, application Germany Jan. 14, 1960
6 Claims. (Cl. 260—147)

The present invention relates to new water-insoluble azo-dyestuffs and to a process for preparing them; more particularly it relates to complex metal compounds of water-insoluble azo-dyestuffs corresponding to the following general formula

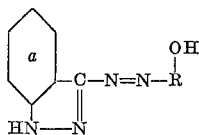

wherein the benzene radical $a$ may be substituted by groups which do not impart solubility in water and R represents the radical of a coupling component being free from sulfonic acid and carboxylic acid groups and coupling in a position adjacent to the hydroxyl group, with the exception of arylides of aromatic or heterocyclic ortho-hydroxycarboxylic acids or of acylacetic acids.

We have found that new water-insoluble metalliferous azo-dyestuffs are obtained by coupling in substance, on the fiber or on another substratum the diazonium compounds of amines corresponding to the following general formula

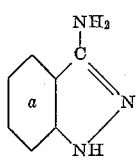

wherein the benzene radical $a$ may contain substituents which do not impart solubility in water, with coupling components being free from sulfonic acid or carboxylic acid groups and coupling in a position adjacent to a hydroxyl group, the use of arylides of aromatic or heterocyclic orthohydroxycarboxylic acids or of acylacetic acids being exempted, and treating the dyestuffs so obtained with agents yielding metal.

As diazo components, there are used for the process of the present invention 3-aminoindazole and its derivatives substituted in the benzene radical $a$ by halogen atoms, alkyl, alkoxy, aryloxy, nitro, trifluoromethyl groups, carboxylic acid amide groups, substituted carboxylic acid amide groups, acyl, alkylsulfonic, arylsulfonic groups, sulfonic acid amide groups, substituted sulfonic acid amide groups, acylamino or arylamino groups. These amino compounds, part of which has not yet been described in literature, can be produced by known methods e.g. by diazotization of ortho-amino-benzonitriles, reduction of diazo compounds with stannous chloride and hydrochloric acid with the formation of hydrazine compounds and ring closure in an acid medium with the formation of 3-aminoindazoles.

As coupling components, there are used compounds coupling in a position adjacent to a hydroxyl group, i.e. aromatic or heterocyclic hydroxyl compounds and compounds containing an enolizable or enolized ketomethylene group which is contained in a heterocyclic ring.

Such compounds are hydroxybenzenes substituted in the para-position such as, for example, 4-methyl-1-hydroxybenzene, 4-isopropyl-1-hydroxybenzene, 4-tertiary-butyl-1-hydroxybenzene, 2-amino-4-hydroxy-1-methylbenzene, 4-acetylamino-1-hydroxybenzene or 4-benzoylamino-1-hydroxybenzene; polyhydroxybenzenes such, for example, as 1,3-dihydroxybenzene, 2,4-dihydroxybenzophenone or 1,3,5-trihydroxybenzene; hydroxynaphthalenes such, for example, as 2-hydroxynaphthalene, 6-bromo-2-hydroxynaphthalene, 6-methoxy-2-hydroxynaphthalene, 7-methoxy-2-hydroxynaphthalene, 1-acylamino-7-hydroxynaphthalenes, 5-chloro-1-hydroxynaphthalene, 5,8-dichloro-1-hydroxynaphthalene, 1-hydroxy-4-benzoylnaphthalene, 1-hydroxy-4-methoxynaphthalene, 2-hydroxy-7-benzoylaminonaphthalene, 2-hydroxynaphthalene-3-carboxylic acid methyl ester, 2-hydroxynaphthalene-6-carboxylic acid phenylamide, 2-hydroxynaphthalene-6-sulfonic acid amide, 1-hydroxynaphthalene-5-sulfonic acid amide or 2-hydroxynaphthalene-6-alkylsulfones, dihydroxynaphthalenes such, for example, as 1,3-dihydroxynaphthalene, 2,6-dihydroxynaphthalene or 2,7-dihydroxynaphthalene; pyrazolones, for example, 1-phenyl-5-pyrazolone-3-carboxylic acid amides, 1-(naphthyl-2')-3-methyl-5-pyrazolone, 1-phenyl-3-methyl-5-pyrazolone, 1-(4'-chlorophenyl)-3-methyl-5-pyrazolone or 1-(2',5'-dichlorophenyl)-3-methyl-5-pyrazolone, 2-hydroxyquinoline, 2,4-dihydroxyquinoline, 2-hydroxycarbazole, 3-hydroxycarbazole, 2-hydroxydiphenylene oxide or barbituric acid derivatives.

The coupling of the diazonium compounds with the coupling components can be carried out in known manner. The dyestuffs can be produced on vegetable fibers, including fibers of regenerated cellulose, for instance, by treating the goods to be dyed with the alkaline solution of the coupling component, removing the excess solution by squeezing the material and effecting the dyestuff formation in usual manner, if desired, after having intermediately dried the impregnated goods.

Since the diazonium compounds of the amines used for the process of the present invention are energetic dyestuff formers, the coupling which is preferably carried out in a weakly acid bath proceeds rapidly and completely.

The treatment of the water-insoluble azo-dyestuffs obtainable according to the process of the present invention with the agents yielding metal may be carried out in substance, on the fiber or in the dyeing bath. As agents yielding metal, there are used for the process of the present invention compounds yielding iron, chromium, uranium, manganese, aluminum, cadmium, zinc, particularly copper, cobalt or nickel which may be used in the form of their inorganic or organic salts such, for example, as chlorides, bromides, sulfates, nitrates, formates or acetates, or as complex compounds, especially with hydroxyalkylamines, such, for example, as diethanolamine, triethanolamine or N-methylethanolamine, or with aminocarboxylic acid, such, for example, as amino acetic acid or nitrilotriacetic acid, or with aliphatic hydroxycarboxylic acids, such, for example, as citric acid, tartaric acid, gluconic acid or glycolic acid, or with alkali metal phosphates, such, for example, as alkali metal pyrophosphates or alkali metal polyphosphates.

When the dyestuffs are produced on the fiber, the compound yielding metal may be added to the developing bath and the metallization is effected by raising the temperature. The treatment of the dyestuffs with the agents yielding metal may also be carried out in a second bath which is neutral, weakly alkaline or weakly acid and may contain dispersing agents or detergents, for example, a fatty alcohol, polyglycol ether, an alkylphenol polyglycol ether, an alkylnaphthol polyglycol ether, a fatty acid polyglycol ester or a fatty acid amide polyglycol ether.

The production of the dyestuffs on the fiber may also be carried out in such a manner that the goods to be dyed are treated with the alkaline solution of the metal-free dyestuff and this dyestuff is then converted into the complex metal compound by treating it with agents yielding metal. This process may be applied in such cases in which the metal-free dyestuffs produced in substance yield water-soluble alkali metal compounds, which holds true for a large number of dyestuffs.

The new dyestuffs can also be produced on animal fibers, such as wool or silk and on synthetic fibers such as polyamide, acetylcellulose, or polyvinyl alcohol fibers, by the usual dyeing processes for such fibers, and valuable dyeings possessing good properties of fastness are obtained.

The dyestuffs can also be prepared in substance and converted into complex metal compounds by treatment with agents yielding metal. The metallization can be carried out in an aqueous suspension or in organic solvents such, for example, as alcohol, acetone or dimethylformamide, the addition of small amounts of pyridine favorably influencing in some cases the formation of complexes.

The complex metal dyestuffs so obtained exhibit in most cases a great coloring strength and are generally soluble in acetone, carboxylic acid esters and nitrocellulose lacquers, so that they are suitable for the preparation of color lakes.

The complex metal dyestuffs prepared in substance are suitable for dyeing animal fibers such as wool or silk, for dyeing synthetic fibers such a polyamide, polyurethane, acetylcellulose or polyester fibers and for coloring organic plastic masses of high molecular weight.

The following examples serve to illustrate the invention but they are not intended to limit it thereto, the parts being by weight unless otherwise stated, and the relationship of parts by weight to parts by volume being the same as that of the kilogram to the liter.

*Example 1*

A cotton fabric was padded on the foulard with a solution containing, per liter of water, 7.2 grams of 2-hydroxynaphthalene, 30 grams of a wetting agent of the type of the oil sulfonates and 15 cc. of sodium hydroxide solution of 38° Bé., and dried. The dyestuff was then developed at a goods-to-liquor ratio of 1:20 with a diazo solution prepared by diazotization of 0.56 gram of 3-amino-6-chloro-indazole with 2.52 cc. of hydrochloric acid of 20° Bé. and 0.25 gram of sodium nitrite and containing, per liter of water, 10 grams of sodium acetate and 1 gram of cobalt chloride, by treating the material to be dyed, after introduction into the developing bath, first for 20 minutes at room temperature, then heating the bath to 90° C. to 95° C. and treating the material for 30 minutes at this temperature. The material was then neutralized, rinsed, soaped at 60° C., rinsed again and dried.

A dark green dyeing having a very good fastness to light was obtained.

By using in the above example 1.04 grams of copper sulfate instead of 1 gram of cobalt chloride, a dark blue dyeing was obtained; using 1.18 grams of nickel sulfate, a current dyeing having a good fastness to light was obtained.

*Example 2*

By using in Example 1 5.5 grams of 1,3-dihydroxybenzene instead of 7.2 grams of 2-hydroxynaphthalene, and proceeding in the manner indicated in this example, there were obtained with cobalt chloride a dark grey dyeing with copper sulfate a blue grey dyeing and with nickel sulfate a red brown dyeing all having good properties of fastness to light.

*Example 3*

A cotton fabric was padded with the following solution and dried:

10 grams of the dyestuff obtained by coupling diazotized 3-amino-6-methoxyindazole with 1-phenyl-3-methyl-5-pyrazolone were made into a paste with 50 cc. of alcohol and 9 cc. of sodium hydroxide solution of 38° Bé., the paste was dissolved with boiling water and the whole made up to 1 liter with water.

The fabric was then treated at 90° C. with a solution containing, per liter of water, 2.8 grams of nickel sulfate, 3 cc. of acetic acid and 10 grams of sodium acetate, rinsed and dried.

A golden yellow dyeing having a good fastness to light, washing and chlorine was obtained.

The dyestuff used was prepared as follows:

16.3 parts of 3-amino-6-methoxyindazole were dissolved in 500 parts by volume of water and 30 parts by volume of hydrochloric acid of 20° Bé. and diazotized at room temperature by the addition of a concentrated aqueous solution of 6.9 parts of sodium nitrite. To the diazo solution clarified by filtration, there was added at room temperature, while stirring, a solution of 17.5 parts of 1-phenyl-3-methyl-5-pyrazolone in 200 parts by volume of water and 9 parts by volume of sodium hydroxide solution of 38° Bé. which solution furthermore contained 1 part of a reaction product from about 20 mols of ethylene oxide and 1 mol of oleyl alcohol. The coupling to the azo-dyestuff set in rapidly; it was completed by neutralization with sodium hydroxide solution of 38° Bé. After completion of the reaction, the yellow azo-dyestuff was separated by suction-filtration, washed with water and dried.

*Example 4*

Cotton yarn was dyed for 90 minutes at boiling temperature and at a goods-to-liquor ratio of 1:20 with 3% of the dyestuff indicated in Example 3, 2.25% of sodium hydroxide solution of 38° Bé. and 40% of sodium chloride.

The yarn was then rinsed and aftertreated for 30 minutes at 90° C. with 3% of copper sulfate, 3% of acetic acid of 50% strength and 20% of sodium acetate, rinsed and dried.

A copper brown dyeing having a good fastness to water, washing, perspiration and light was obtained.

*Example 5*

Polyamide yarn was dyed at boiling temperature for 90 minutes at a goods-to-liquor ratio of 1:20 in a bath containing, per liter, 6% of the complex cobalt compound of the dyestuff obtained by coupling diazotized 3-amino-6-chloroindazole with 2-hydroxynaphthalene - 6 - sulfonic acid amide, and 2 grams of a wetting agent of the type of the oil sulfonates, 2 grams of ortho-phenylphenol, 1 gram of tetrahydronapthalene, 1 gram of a dispersing agent of the type of the alkylarylsulfonates, 1 gram of a condensation product obtained from formaldehyde and β-naphthalene sulfonic acid.

A green dyeing having a very good fastness to thermofixation with saturated steam and a very good fastness to light was obtained.

The dyestuff used was prepared as follows:

16.8 parts of 3-amino-6-chloroindazole were well stirred in 400 parts by volume of water and 45 parts of concentrated sulfuric acid and the concentrated aqueous solution of 6.9 parts of sodium nitrite was added thereto at a temperature ranging from 30° C. to 35° C. After dissolution, the diazo solution was clarified by filtration. Into this diazo solution there was run, while stirring, at room temperature a solution of 24.5 parts of 2-hydroxynaphthalene-6-sulfonic acid amide in 500 parts by volume of water and 20 parts by volume of sodium hydroxide solution of 38° Bé. To complete the dyestuff formation, the reaction mass was neutralized by slowly dropping in 50 parts by volume of sodium hydroxide solution of 38° Bé.

After completion of the coupling, 5 parts of calcined sodium carbonate were introduced. The whole was then heated to a temperature ranging from 50° C. to 60° C., the red, water-insoluble dyestuff was removed by filtration and washed with water.

To convert the dyestuff into the complex cobalt compound, the wet filter cake was suspended in 500 parts by volume of acetone and 60 parts by volume of pyridine. A concentration aqueous solution of 23.8 parts of crystallized cobalt chloride was then added and the reaction mixture was stirred for some hours in the presence of air until the color of the solution turned green. After the addition of 1000 parts by volume of water the acetone and pyridine were separated by heating, the reaction mass was acidified with 25 parts by volume of concentrated acetic acid and cooled, the precipitated product was filtered off with suction, washed and dried.

The complex cobalt compound so obtained was a greenish black powder which dissolved in dilute sodium hydroxide solution, acetone or dioxane to give a green solution.

Example 6

15 parts of 2-hydroxynaphthalene were dissolved with 0.5 part of a reaction product from about 20 mols of ethylene oxide and 1 mol of oleyl alcohol while adding 18 parts by volume of sodium hydroxide solution of 38° Bé. in 500 parts by volume of water with slight heating. The solution so obtained was run, while stirring well, into a diazo solution obtained by diazotization of 16.3 parts of 3-amino-6-methoxyindazole. The temperature was maintained at 25° C. to 30° C. by cooling and a pH of about 7 was maintained by slowly dropping in 12 parts by volume of sodium hydroxide solution of 38° Bé. After completion of the coupling, the yellowish red dyestuff formed was separated by filtration and washed.

For converting the dyestuff into the complex copper compound, the wet filter cake was suspended in 600 parts by volume of acetone and a concentrated aqueous solution of 17.1 parts of crystallized cupric chloride and 50 parts by volume of pyridine was added to this suspension. After stirring for a short time, the metallization was complete.

The reaction mass was then made up with water to 2000 parts by volume and acidified with 40 parts by volume of concentrated acetic acid, the dyestuff was separated by suction-filtration, washed and dried. It was a bluish black powder having a great coloring strength.

In order to prepare the complex cobalt compound, 24 parts by weight of crystallized cobalt chloride were substituted for the amount of cupric chloride specified in the above example and the reaction mass was stirred for some hours at room temperature and in the presence of air until it turned green. The complex cobalt compound was obtained, as described above, in the form of a deep-green powder having a great coloring strength.

By using in the above example 24 parts of crystallized nickel chloride instead of the indicated amount of cupric chloride, and carrying out the conversion while heating with reflux, there was obtained with similar working up the complex nickel compound in the form of a dark reddish powder which dissolved in acetone or other organic solvents to give a violet solution.

In the following table further components are listed which can be used in the process of the invention, and the tints produced by the metalliferous azo-dyestuffs obtained:

| Diazo component | Coupling component | Tint | | |
|---|---|---|---|---|
| | | cobalt complex | copper complex | nickel complex |
| 3-amino-6-ethoxy-indazole | 1,3-dihydroxybenzene | dark brown. | dark grey. | brownish claret. |
| Do | 2-hydroxy-6-methoxy-naphthalene. | green | greenish grey. | currant. |
| Do | 2-hydroxy-7-methoxy-naphthalene. | greenish dark grey. | dark violet. | brownish claret. |
| Do | 2-hydroxynaphthalene-3-carboxylic acid-methylester. | | dark grey | |
| Do | 2-hydroxynaphthalene. | green | grey | brown. |
| Do | 1-hydroxy-4-benzoyl-naphthalene. | dark green. | dark grey | dark violet. |
| 3-amino-6-methoxyindazole. | 1,3-dihydroxybenzene | | do | brownish claret. |
| Do | 2-hydroxy-6-methoxy-naphthalene. | green | dark green. | Do. |
| Do | 2-hydroxy-7-methoxy-naphthalene. | dark olive green. | violetish dark grey. | Do. |
| Do | 2-hydroxynaphthalene-3-carboxylic acid-methylester. | | dark grey | |
| Do | 2-hydroxynaphthalene. | green | blue grey | red brown. |
| Do | 1-hydroxy-4-benzoyl-naphthalene. | dark grey | do | violet. |
| Do | 2-amino-4-hydroxy-1-methylbenzene. | grey | do | red brown. |
| 3-aminoindazole | 2-hydroxycarbazole | dark brown olive. | | |
| 3-amino-4-chloroindazole | 2-hydroxynaphthalene | green | do | |
| 3-amino-5-chloroindazole | do | do | do | |
| 3-amino-6-methylindazole | do | do | do | |
| 3-amino-5-methoxyindazole. | do | do | do | |
| 3-amino-5-methoxy-6-chloroindazole. | do | do | do | |
| 3-amino-6-acetylindazole | do | do | do | |
| 3-amino-5-phenylsulfonylindazole. | do | do | do | |
| 3-aminoindazole-5-sulfonic acid-diethylamide. | do | do | do | |
| 3-amino-5-trifluoromethyl-indazole. | do | do | do | |
| 3-amino-6-trifluoromethyl-indazole. | do | do | do | |
| 3-amino-6-nitroindazole | do | do | do | |
| 3-aminoindazole-6-carboxylic acid amide. | do | do | do | |
| 3-amino-5-methyl-sulfonyl-indazole. | do | do | do | |
| 3-amino-5-benzoylamino-indazole. | do | do | do | |

We claim:
1. A complex metal compound containing a metal selected from the group consisting of copper, cobalt and nickel, of an azo-dyestuff having the following formula

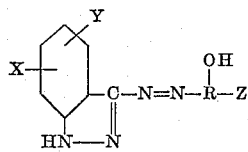

wherein X represents a member selected from the group consisting of a hydrogen atom, chlorine atom, a methyl, methoxy, ethoxy, trifluoromethyl, sulfonic acid diethylamide, carboxylic acid amide, methyl sulfone, phenyl sulfone, benzoylamino, acetyl and nitro group, Y stands for a member selected from the group consisting of a hydrogen atom and a methoxy group, R represents a member selected from the group consisting of benzene, naphthalene and carbazole, and Z stands for a member selected from the group consisting of a hydrogen atom, a hydroxy, methoxy, benzoyl, carboxylic acid methyl ester and sulfonic acid amide group, and wherein the group OH stands in a position adjacent to the azo group.

2. The complex copper compound of the water-insoluble azo-dyestuff having the formula

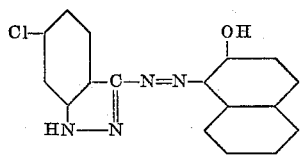

3. The complex cobalt compound of the water-insoluble azo-dyestuff having the formula

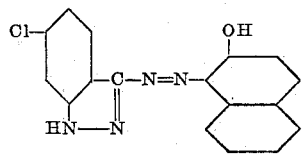

4. The complex copper compound of the water-insoluble azo-dyestuff having the formula

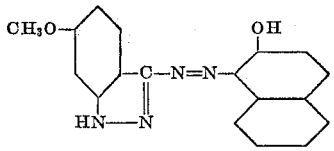

5. The complex cobalt compound of the water-insoluble azo-dyestuff having the formula

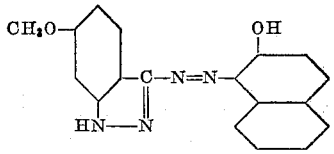

6. The complex copper compound of the water-insoluble azo-dyestuff having the formula

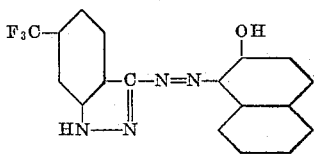

References Cited in the file of this patent
UNITED STATES PATENTS

| | | |
|---|---|---|
| 2,544,936 | Petitcolas et al. | Mar. 13, 1951 |
| 2,883,373 | Bassard et al. | Apr. 21, 1959 |

FOREIGN PATENTS

| | | |
|---|---|---|
| 981,432 | France | May 25, 1951 |